US010255701B2

(12) United States Patent
Cai et al.

(10) Patent No.: US 10,255,701 B2
(45) Date of Patent: Apr. 9, 2019

(54) SYSTEM, METHOD AND COMPUTER PROGRAM PRODUCT FOR ELECTRONIC DOCUMENT DISPLAY

(71) Applicant: International Business Machines Corporation, Armonk, NY (US)

(72) Inventors: Keke Cai, Beijing (CN); Dongxu Duan, Beijing (CN); Zhong Su, Beijing (CN); Li Zhang, Beijing (CN); Xiaolu Zhang, Beijing (CN); Shiwan Zhao, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 73 days.

(21) Appl. No.: 15/271,292

(22) Filed: Sep. 21, 2016

(65) Prior Publication Data

US 2018/0082448 A1     Mar. 22, 2018

(51) Int. Cl.
*G06T 11/20* (2006.01)
*G06K 9/00* (2006.01)

(52) U.S. Cl.
CPC ........ *G06T 11/206* (2013.01); *G06K 9/00463* (2013.01)

(58) Field of Classification Search
None
See application file for complete search history.

(56) References Cited

U.S. PATENT DOCUMENTS

| | | | |
|---|---|---|---|
| 5,694,594 A * | 12/1997 | Chang | G06F 17/30855 |
| 6,112,203 A * | 8/2000 | Bharat | G06F 17/218 |
| 6,373,502 B1 * | 4/2002 | Nielsen | G06F 17/30896 |
| | | | 707/E17.118 |
| 7,260,781 B2 | 8/2007 | DeMello et al. | |
| 7,743,326 B2 | 6/2010 | Kanai | |
| 8,577,911 B1 * | 11/2013 | Stepinski | G06F 17/30 |
| | | | 707/765 |
| 8,631,343 B1 | 1/2014 | Rana | |
| 2004/0268253 A1 | 12/2004 | DeMello et al. | |
| 2005/0183031 A1 | 8/2005 | Onslow | |
| 2005/0257400 A1 * | 11/2005 | Sommerer | G06F 17/30873 |
| | | | 36/13 |
| 2006/0195461 A1 * | 8/2006 | Lo | G06F 17/30011 |
| 2007/0180372 A1 * | 8/2007 | Graham | G06F 17/30867 |
| | | | 715/210 |
| 2008/0263022 A1 * | 10/2008 | Kostorizos | G06F 17/30864 |

(Continued)

OTHER PUBLICATIONS

Mel, et al. "The NIST Definition of Cloud Computing". Recommendations of the National Institute of Standards and Technology. Nov. 16, 2015.

*Primary Examiner* — Ryan McCulley
(74) *Attorney, Agent, or Firm* — Vazken Alexanian; McGinn IP Law Group, PLLC

(57) ABSTRACT

A method, system, and computer program product, include receiving a first input at a first element among a plurality of elements associated with at least one electronic document, determining a second element associated with the first element from the plurality of elements based on predetermined relations of the plurality of elements, and causing a view to be displayed together with an electronic document including the first element, the view at least including the second element.

20 Claims, 8 Drawing Sheets

(56) References Cited

U.S. PATENT DOCUMENTS

| | | | |
|---|---|---|---|
| 2011/0131211 A1* | 6/2011 | Harrington | G06F 17/30643 707/741 |
| 2012/0054226 A1* | 3/2012 | Cao | G06F 17/30716 707/769 |
| 2013/0061182 A1* | 3/2013 | Weise | G06F 3/0482 715/853 |
| 2015/0072330 A1* | 3/2015 | Rosenberg | G09B 5/02 434/319 |
| 2016/0321357 A1* | 11/2016 | Novacek | G06F 17/30705 |
| 2018/0024731 A1* | 1/2018 | Sanches | G06F 3/04817 |

* cited by examiner

200↘

For the user-item data, the propagation factor $\psi$ defined in Equation 5 will become

202

$$\psi(v,v') = \frac{1}{|out(v)|^\rho}$$

We compare the Hit Ratio of our SS-IPF with other three algorithms, ItemKNN, UserKNN, and PersonalPR [4], on CiteULike and Delicious datasets. Results are shown in Figure 2 and Figure 3.

208

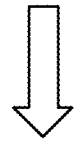

206

$$\psi(v,v') = \begin{cases} \frac{1}{|out(v)|^\rho} & v \in U \cup S, v' \in I \\ \left(\frac{\eta}{\eta|out(v)\cap U|+|out(v)\cap S|}\right)^\rho & v \in I, v' \in U \\ \left(\frac{1}{\eta|out(v)\cap U|+|out(v)\cap S|}\right)^\rho & v \in I, v' \in S \end{cases}$$

5.3 Com...

In last tw...
for top-N r...
mous algor...
ing [18] (It...
ItemKNN,...
sonalPR, w...
temporal d...
gorithm, w...
ment of sca...
do not com...
methods, because they only achieve slight improvement on implicit binary data [5].

Research on temporal top-N recommendation on binary data began in recent years, but only got a little attention. Ding et al. [2] and Andreas [23] both proposed a time-weighted item-based collaborative filtering method (TItemKNN) by reducing the influence of old data when predicting users' further behavior. TItemKNN was designed for rating prediction task but it can be easily extended to Top-N recommendation for binary data. Similarly, UserKNN can also be $$w(v,v') = \begin{cases} 1 & v \in U \cup S, v' \in I \\ \eta_v & v \in I, v' \in U \\ \eta_0 & v \in I, v' \in S \end{cases} \quad (1)$$

$$\psi(v_k, v_{k+1}) = \frac{w(v_k, v_{k+1})}{\sum_{v' \in out(v_k)} w(v_k, v')} \quad (4)$$

$$out(v_k) = \{v' \in V : e(v_k, v') \in E\}, \rho \in [0,1]$$

$$\psi(v,v') = \begin{cases} \frac{|out(v)|^\rho}{[\eta|out(v)|^\rho + |out(v) \cap U|^\rho + |out(v) \cap S|^\rho]^\rho} & v \in U \cup S, v' \in I \\ & v \in I, v' \in U \\ & v \in I, v' \in S \end{cases} \quad (5)$$

data can improve recommendation accuracy.
For the user-item data, the propagation factor $\psi$ defined in Equation 5 will become $$\psi(v,v') = \frac{1}{|out(v)|^\rho} \quad 204$$

We compare the Hit Ratio of our SS-IPF with other three algorithms, ItemKNN, UserKNN, and PersonalPR [4], on CiteULike and Delicious datasets. Results are shown in Figure 2 and Figure 3.

FIG. 4

SYSTEM, METHOD AND COMPUTER PROGRAM PRODUCT FOR ELECTRONIC DOCUMENT DISPLAY

BACKGROUND

The present invention relates generally to a document display method, and more particularly, but not by way of limitation, to a system, method, and computer program product for displaying one or more electronic documents.

It has become increasingly common to display and read electronic documents, which have a number of advantages over paper documents including portability and compact size. The widespread use of electronic documents has allowed the users to easily navigate and view documents (e.g. on computers, portable multifunction devices, and the like). An electronic document typically has content elements such as text, graphics, and pictures. More and more electronic documents are embedded with reference elements that are cross-referenced to content elements in the same document or linked to content elements in other documents, enhancing easy navigation and reading experience. However, a problem with the traditional approaches is that the reader may have to navigate the document in an inefficient way, especially when the reference elements overwhelm the electronic document. As a result, the user's reading experience may not be enhanced as desired, but instead may be compromised.

SUMMARY

In an exemplary embodiment, the present invention can provide a computer-implemented method including receiving a first input at a first element among a plurality of elements associated with at least one electronic document, determining a second element associated with the first element from the plurality of elements based on predetermined relations of the plurality of elements, and causing a view to be displayed together with an electronic document including the first element, the view at least including the second element.

One or more other exemplary embodiments include a computer program product and a system.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which:

FIG. 2 is a schematic diagram illustrating a traditional approach for displaying an electronic document with cross-references;

FIG. 4 is a schematic diagram illustrating an interactive display of an electronic document with cross-references in accordance with embodiments of the present disclosure;

DETAILED DESCRIPTION

Figure 1:
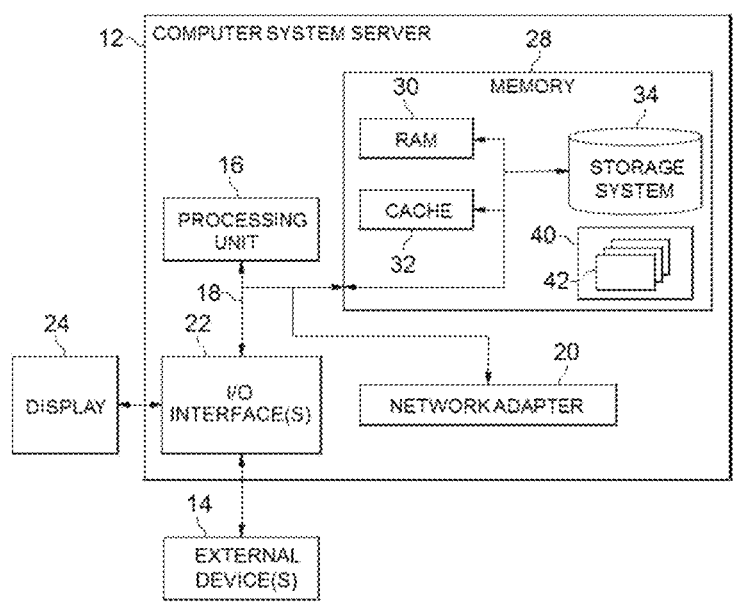
FIG. 1 depicts a cloud computing node 10 according to an embodiment of the present invention.

The invention will now be described with reference to FIG. 1-9, in which like reference numerals refer to like parts throughout. It is emphasized that, according to common practice, the various features of the drawing are not necessarily to scale. On the contrary, the dimensions of the various features can be arbitrarily expanded or reduced for clarity.

Figure 3:
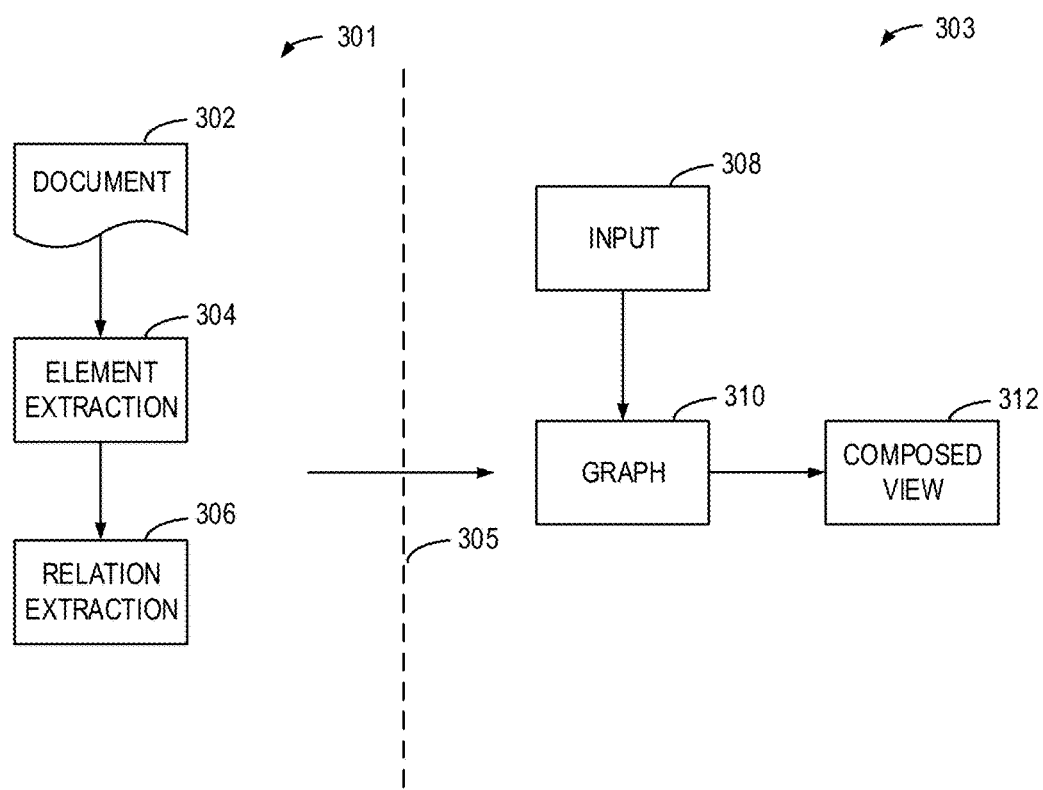
FIG. 3 is a high level block diagram illustrating idea of embodiment of the present disclosure.

With reference now to the example depicted in FIG. 3, the method 300 includes various steps to cause a view to be displayed together with an electronic document. As shown in at least FIG. 1, one or more computers of a computer system 12 according to an embodiment of the present invention can include a memory 28 having instructions stored in a storage system to perform the steps of FIG. 3.

Although one or more embodiments (see e.g., FIGS. 1 and 8-9) may be implemented in a cloud environment 50 (see e.g., FIG. 8), it is nonetheless understood that the present invention can be implemented outside of the cloud environment.

As mentioned above, traditional approaches for document display and navigation may be cumbersome and inefficient. FIG. 2 shows a traditional approach for displaying an electronic document with cross-references. As shown in FIG. 2, a portion 200 of the document is currently displayed, for example, on the display 24 shown in FIG. 1. In the portion 200, a reference element 202, for example, the phrase "Equation 5," is cross-referenced to a content element in the document, for example, an equation named "Equation 5." The equation may be located in a portion 206 of the document. For example, the reader may not remember the equation and want to refer to the equation for review. To this end, the user may navigate the cursor onto the content element 202, when the appearance of the cursor may be automatically changed to a hand. Then, the user may click on the content element 202, and the view currently displayed may be changed to the portion 206. In this way, the user may review the equation as desired.

However, the user usually has to navigate a great number of pages to return to the initial location, for example, the portion 200. Moreover, the user may not remember the symbols and definitions in "Equation 5" and want to refer to associated locations for further review. As a result, the user may be required to navigate the document through dozens of reference elements. In addition, when the user continues the document by returning to the initial location, for example, the portion 200, the user should navigate the document in a reverse direction step by step. Such conventional interaction approach is inconvenient especially for those documents including a great number of reference elements.

For example, the reference element 208 called "FIG. 3" may be cross-referenced to a figure located several pages away from the portion 200. When viewing "Equation 5," the user may want to observe the results as shown in "FIG. 3." However, the user has to navigate back to the initial location (for example, the portion 200) and then click on the reference element 208 to jump to "FIG. 3." Thus, the navigation across multiple locations in the document may be a slow and cumbersome operation that is not terribly user-friendly.

Embodiments of the disclosure are proposed to at least partially solve the above and other potential problems. FIG. 3 is a high level block diagram illustrating the basic idea of embodiments of the present disclosure. In general, as shown in FIG. 3, there are two processing stages, namely offline stage 301 and online stage 303 which are separated by dashed line 305 in the figure. At offline stage, a representation of at least part of the document is constructed, while at online stage 303, the elements of interest in the document are structured and displayed. It is to be understood that the online and offline stages are separated only for the purpose of illustration, without suggesting any limitations as to the scope of the disclosure. In some embodiments, the offline stage 301 may be carried out in the online stage 302.

It is to be understood that the blocks shown in FIG. 3 can be considered as either process steps or system components. Moreover, a content element herein may serve as a reference element linked to a further content element. Accordingly, the term "element" may refer to a content element and a reference element that is linked to a content element.

In the offline stage 301, a representation of at least part of the document 302 may be constructed. The representation is an intuitive visualization for the underlying elements and their relationship. In some embodiments, the representation is a graph 310, for example. It is to be understood that in the context of present disclosure, a graph representation refers to any suitable data structure that can represent the relationships between different data items.

The elements may be represented by nodes in the graph 310, and the relations between two elements may be represented by edges connecting the two nodes representing the two elements. In some embodiments, lengths of the edges may represent the relative weights between the relations represented by the edges. In some embodiments, the nodes may include information associated with weights of the elements represented by the nodes.

Now example embodiments of constructing the graph 310 will be described. With reference to FIG. 3, at block 302, an electronic document 302 is provided and optionally displayed in a graphical user interface on the display 24. At block 304, various elements may be extracted from the document 302. As described above, the elements may be categorized into two types, that is, content elements and reference elements. The reference elements may sometimes be called pointers, which are linked to the content elements.

The content elements may include, for example, figures, formulas, notations, paragraphs, tables, and the like. Accordingly, the reference elements may be linked to figures, formulas, notations, paragraphs, tables, or the like. The elements may be called entities, and any method for extracting or resolving entities currently known or to be developed in the future may be employed. Popular methods for extracting entities may include for example a rule-based method and a format-based method. In the rule-based method, a list of rules may be defined, for example, in terms of keywords. Such keywords may include "Fig.," "FIG.," "Equation," "Table," and the like, for example. The entities may be determined as respective categories if they match the keywords specified in the list of rules. In the format-based method, a list of formats may be defined, including brackets, parentheses, upper-cases, abbreviations, for example. The entities may be determined as respective categories if they match the formats. It is to be understood that the example methods for extracting entities are described only for the purpose of illustration, without suggesting any limitations as to the scope of the present disclosure.

At block 306, relationship between the elements may be determined. The relations between two respective elements may include definition, reference, dependency, inclusion, and peer, for example. As used herein, the term "definition" herein means that one element defines another element, the term "reference" means that one element refers to another element, the term "dependency" means that one element is dependent on another element, the term "inclusion" means that one element is included in another element, and the term "peer" means that the two elements have a peer-to-peer relations.

For example, two elements may be defined to be in a peer relation if they are proximity to each other. The peer relations may be considered to significantly improve the reading experience for the documents with very dense cross-references. The relations may be categorized into two classes, directed relations and undirected relations. For example, definition, reference, dependency, inclusion may be categorized as directed relations while peer may be categorized as undirected relations.

In order to extract relations between two respective elements, a variety of methods may be exploited, including, for example, a learning-based method. In the learning-based method, a number of features may be defined, for example, keywords, symbols, special characters, structures, and the like. The relations may be categorized into several classes by any classifier either currently known or to be developed in the future.

In addition, the weights for the relations may also be determined by learning-based method. The features may include, for example, the types of the relations and the distances of the two associated elements. In this way, a regression model may be built to determine the weights by any regression algorithm currently know or to be developed in the future.

Then, the elements and relations may be defined as nodes and edges, forming the graph 310. In the graph 310, elements of different types may be represented by nodes with different geometries, colors and/or any other factors, for example. Relations of different types may be represented by edges with different appearances, for example solid line, dashed line, and so on. In some embodiments, the directed relations are represented by edges with arrows at one end while undirected relations are represented by edges without arrows at both ends. In some embodiments, the online stage 301 may be carried out when the electronic document is opened and the graph 310 may be generated at the same time. Alternatively, the online stage 301 may be carried out when the electronic document is generated or edited such that the graph 310 may be embedded into the document.

Additionally, weights for the elements or nodes may be defined to refine the graph 310. To this end, a learning-based method may be used. In accordance with embodiments of the present disclosure, a variety of features may be defined, for example, position, frequency, citation number, element type and the like. In some embodiments, the nodes or elements with a larger priority may be assigned with a larger weight. By way of example, an element with a larger frequency may be assigned with a larger weight than another element with a higher frequency, an element of an equation type may be assigned with a larger weight than another element of a figure type, and the like. For example, the weights may be determined by any regression method currently known or to be developed in the future.

The online stage 303 implements an interactive display of the document 302. For example, a composed view 312 may be generated from the graph 310 and displayed to the user. FIG. 4 is a schematic diagram illustrating an interactive display of the documents 302 in accordance with embodiments of the present disclosure. As shown in FIG. 4, the view 400 may be shown in a graphical user interface in the display 24. For example, when the user hovers to the element 204 as indicated by the arrow cursor, the computer system/sever 12 receives an input 308 at the element 204. In this example, the element 204 is linked to "Equation 5" due to a reference relation or linked to "Equation 5" due to a dependency relation. "Equation 5" may be in turn linked to the definition for "out(v)" due to a definition relation, and so on.

Alternatively, in other embodiment, the input 308 may be generated by a click on the element 204 or a predefined gesture, for example, a swipe. It is to be understood that the user interface is described only for the purpose of illustration, without suggesting any limitations as to the scope of the present disclosure.

In response to receiving the input 308, one or more elements associated with the element 204 may be determined based on the predetermined relations of the elements in the documents. In some embodiments, the elements and relations may be represented by the graph 310, as described above. In this case, the node representing the element 204 may be determined in response to the input at the element 204. For example, each element may be directly linked to the node in the graph 310. In some embodiments, the one or more elements associated with the element 204 may be determined based on the distance between the nodes. In some embodiments, the distance may be represented by the number of edges or nodes between the element 204 and the element in question, for example when lengths of the edges are not incorporated into the graph 310. In some embodiment, the distance may be represented by the total length of the edges between the element 204 and the element in question, for example when lengths of the edges have been determined as weights for the relations.

In some embodiments, the graph 310 may be traversed or searched in order to determine the nodes with a distance from the element 204 less than a predetermined distance threshold. For example, a target node may be determined as being associated with the element 204 if the distance between the target node and the node representing the element 204 is less than the predetermined distance threshold. It is to be understood that any algorithm for traversing or searching a graph may be used.

Alternatively, or in addition, the one or more elements may be determined to be associated with the element 204 based on the weights of nodes. For example, if the weight of a target element is greater than a predetermined weight threshold, the target element may be determined to be associated with the element 204.

In some embodiments, the element 204 may only serve as a content element without being linked to another content element. In this case, no action may be performed even if a similar input is received at the element 204.

As shown in FIG. 4, the view 402 is displayed in a floating window. The view 402 includes multiple elements associated with the element 204. The number of element to be displayed may depend at least in part on the predetermined threshold. In this regard, the threshold distance and/or the threshold weight may be defined by the user. As shown in FIG. 4, the view 402 includes "Equation (1)," "Equation (4)," "Equation (5)," and definitions for "out($v_k$)" and "w(v, v')," and so on. In this way, when the user tries to comprehend the element 204, associated elements may be presented to reduce or eliminate redundant cross-references and enhance the reading experience.

As shown in FIG. 4, the element 208 is proximity to the element 204 and consequently the two elements may be in a peer relation. The nodes representing the elements 204 and 208 may be linked to each other by an undirected edge. As shown, "FIG. 3" linked by the element 208 is not displayed in the view 402. The reason for this may be that the weight of the edges or nodes between "FIG. 3" and the element 208 does not satisfy the predefined condition, for example. However, in alternative embodiments, "FIG. 3" may be displayed in the view 402 to help the user to comprehend the document.

In some embodiments, in response to some predefined user inputs, at least a part of the graph 310 may be presented to provide some enhanced functionality. For example, the view 402 may include fewer elements than desired and thus the user may desire to view some more elements. To this end, the view 402 may include an icon 404 labeled "more" to receive user inputs such as clicks. It is to be understood that some other user interface may be defined to receive user inputs. In response to receiving the user input, a subgraph of the graph including multiple nodes may be determined. The subgraph may include at least the nodes representing the elements displayed in the view 402. The subgraph may be determined in a similar way to the one for determining the nodes representing the elements as displayed in the window 402.

Figure 5:
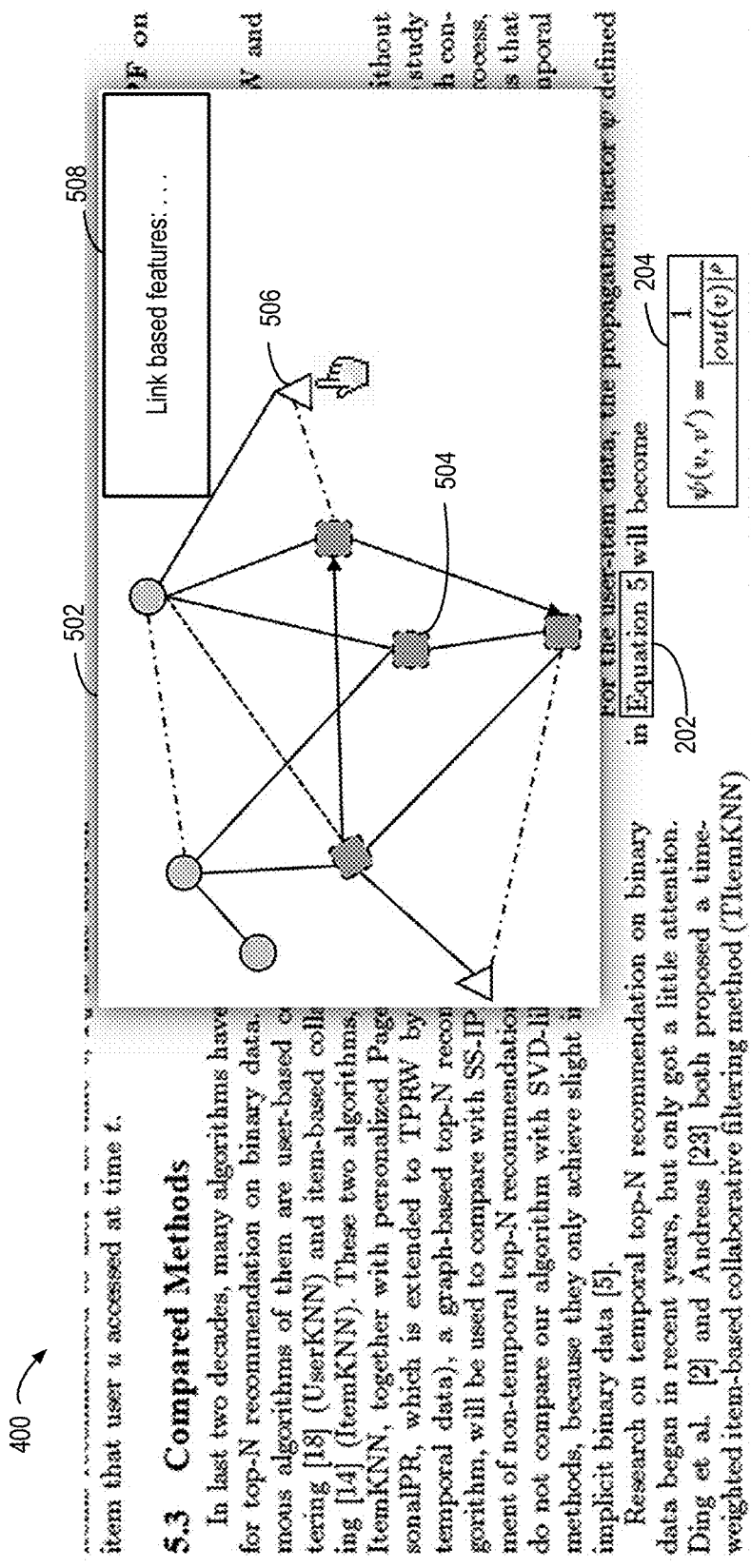
FIG. 5 is a schematic diagram illustrating a further interactive display of an electronic document with cross-references in accordance with embodiments of the present disclosure.

In some embodiments, the subgraph may be displayed on the graphical user interface in a floating window 502, as shown in FIG. 5. The node 504 depicted by a square may represent the element 204. In this regard, the subgraph of the graph 310 as shown is substantially centered on the node 504. When navigating on the subgraph, the cursor may be moved onto a node 506. At this point, the appearance of the cursor may be changed to a hand shape and then a preview of the element represented by the node 506 may be displayed, for example, in another floating window 508. In this way, the user may read much more elements at ease without navigating the document.

In addition, in some embodiments, in response to another predefined user input, the subgraph may be reconstructed. For example, if the user double-clicks on the node 506, the subgraph may be reconstructed such that the node 506 is substantially centered on the subgraph. The reconstructed subgraph may also be determined in a similar way to the one for determining the nodes representing the elements as displayed in the window 402. For example, the nodes may be determined in terms of distances from the node 506. As a result, the user may navigate to some more elements to increase the range for preview and selection.

Figure 6:
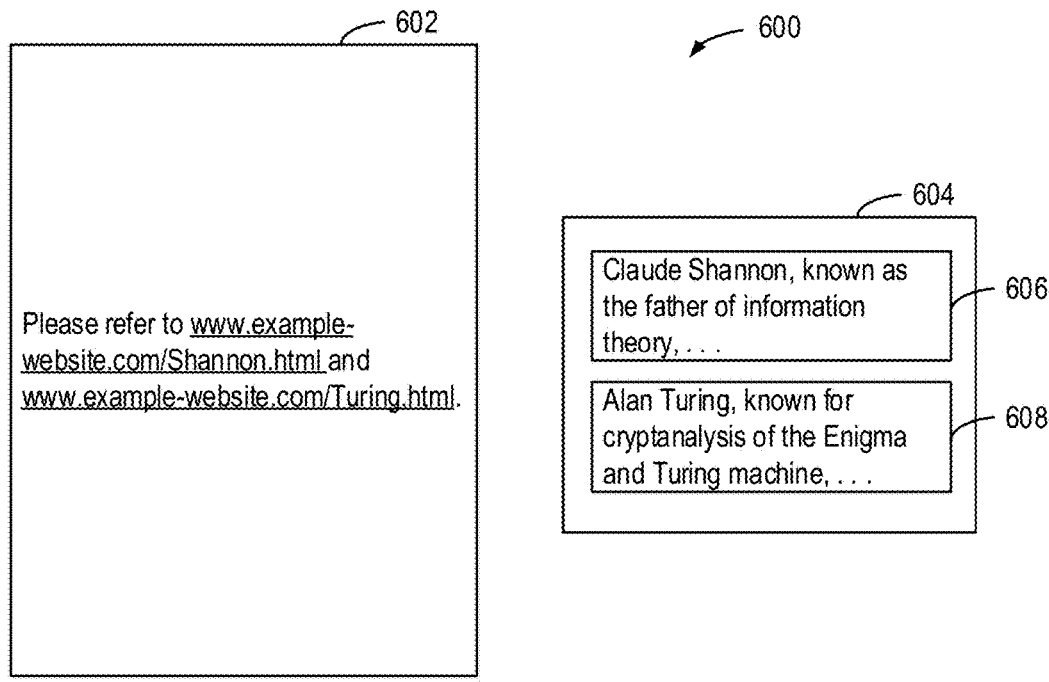
FIG. 6 is a schematic diagram illustrating a display of the documents with links in accordance with embodiments of the present disclosure.

The method has been described in terms of cross-references in the same document. However, it is to be understood that the above method may be easily extended to the case of content display across multiple documents. FIG. 6 is a schematic diagram illustrating a method 600 for displaying content across multiple documents. As shown in FIG. 6, a first electronic document is displayed in the user interface 602. For example, the first document may refer to two hypertext links www.example-website.com/Shannon.html and www.example-website.com/Turing.html, which are linked to the bibliography of Claude Shannon and Alan Turing, respectively. Similar to the method described in connection with FIGS. 3-5, at least a part of the two documents may be displayed in a floating window 604. For example, the first website may be displayed as the portion 606, which shows "Claude Shannon, known as the father of information theory." In this way, the user may have a glance of the website and may not have to skip to the website by a web browser. Similarly, the second website is displayed as the portion 608, which introduces the bibliography of Alan Turing in a general view.

Figure 7:
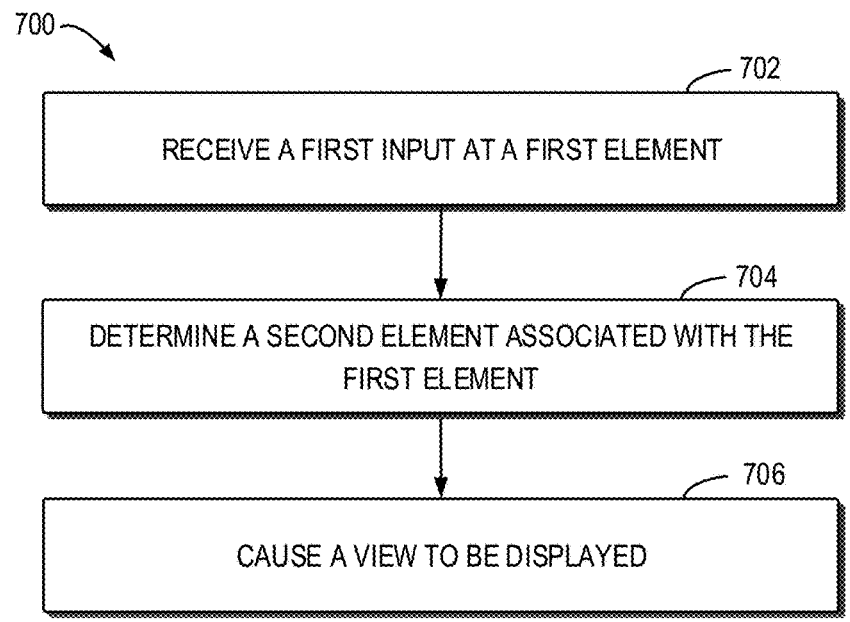
FIG. 7 is a flowchart of a method for displaying an electronic document in accordance with embodiments of the present disclosure.

FIG. 7 is a flow chart illustrating a method 700 for displaying one or more electronic document. At step 702, a first input at a first element among a plurality of elements associated with one or more electronic documents may be received.

At step 704, a second element associated with the first element may be determined from the plurality of elements based on predetermined relations of the plurality of elements.

In some embodiments, determining the second element comprises: determining a first node in the graph representing the first element; determining a second node in the graph based on a distance between the first and second nodes, and/or weights of nodes between the first and second nodes; and determining an element represented by the second node as the second element.

In some embodiments, determining the second node comprises: determining a first subgraph of the graph including a first plurality of nodes in response to a distance between the first node and each of the first plurality of nodes being less than a predetermined distance threshold and/or a weight of each of the first plurality of nodes being greater than a predetermined weight threshold; and determining one of the first plurality of nodes as the second node.

At step 706, a view may be caused to be displayed together with an electronic document including the first element, the view at least including the second element.

In some embodiments, the plurality of elements are represented by nodes in a graph, and the relations of the plurality of elements are represented by edges in the graph between the nodes. In some embodiments, the edges in the graph comprise an undirected edge indicating that elements represented by nodes connected through the undirected edge are proximity to each other.

In some embodiments, the method further comprises: in response to receiving a second input, determining a second subgraph of the graph including a second plurality of nodes, the second subgraph including the first subgraph; and causing the second subgraph to be displayed.

In some embodiments, the method further comprises: in response to receiving a third input at a third node of the second subgraph, causing an element represented by the third node to be displayed.

In some embodiments, the method further comprises: in response to receiving a fourth input at a fourth node of the second subgraph, determining a third subgraph of the graph including a third plurality of nodes in response to a distance between the fourth node and each of the third plurality of nodes being less than a predetermined distance threshold and/or a weight of each of the third plurality of nodes being greater than a predetermined weight threshold; and causing the third subgraph to be displayed.

Exemplary Aspects, Using a Cloud-Computing Environment

Although this detailed description includes an exemplary embodiment of the present invention in a cloud-computing environment, it is to be understood that implementation of the teachings recited herein are not limited to such a cloud-computing environment. Rather, embodiments of the present invention are capable of being implemented in conjunction with any other type of computing environment now known or later developed.

Cloud-computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud-computing environment is service oriented with a focus on statelessness, low coupling, modularity, and semantic interoperability. At the heart of cloud-computing is an infrastructure comprising a network of interconnected nodes.

Referring now to FIG. 1, a schematic of an example of a cloud-computing node is shown. Cloud-computing node 10 is only one example of a suitable node and is not intended to suggest any limitation as to the scope of use or functionality of embodiments of the invention described herein. Regardless, cloud-computing node 10 is capable of being implemented and/or performing any of the functionality set forth herein.

Although cloud-computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud-computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud-computing environments where tasks are performed by remote processing circuits that are linked through a communications network. In a distributed cloud-computing environment, program modules may be located in both local and remote computer system storage media including memory storage circuits.

Referring again to FIG. 1, computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 8:
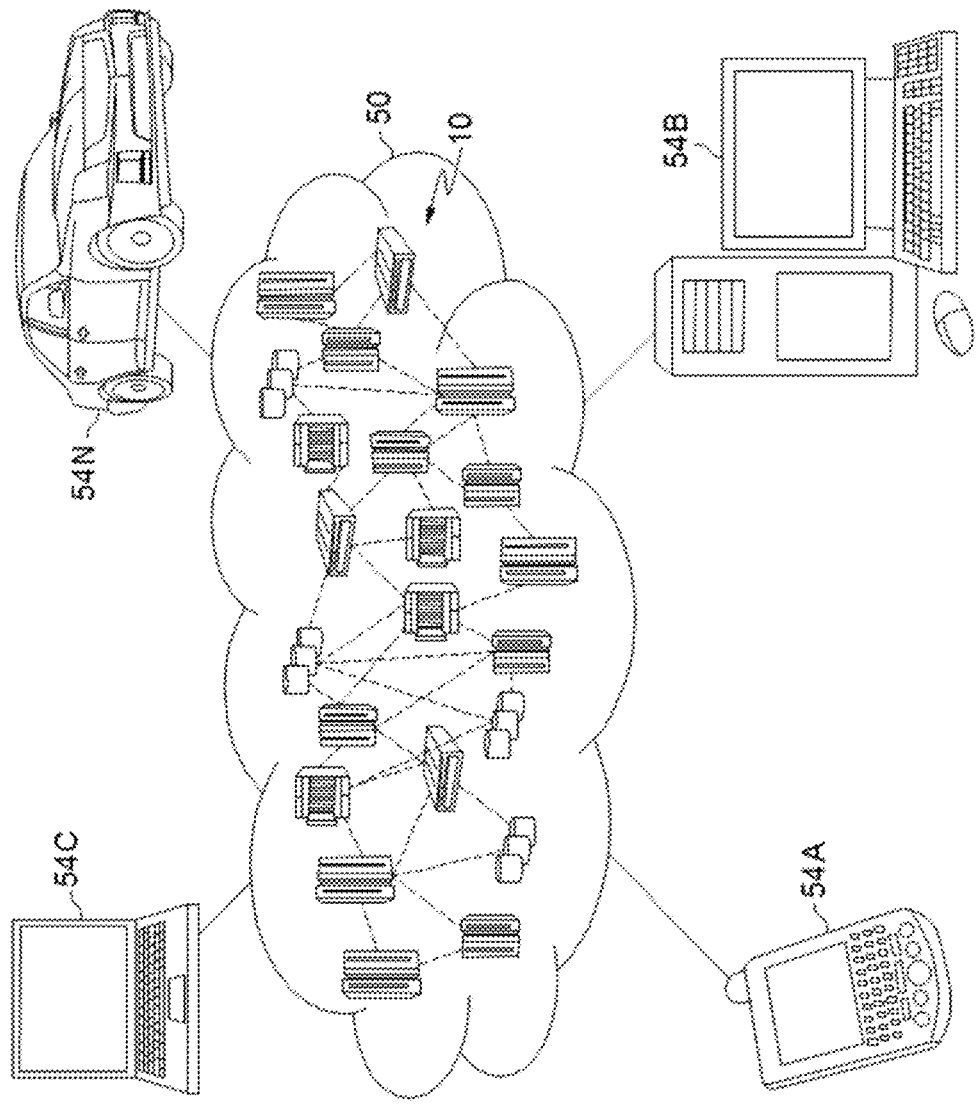
FIG. 8 depicts a cloud computing environment 50 according to an embodiment of the present invention.

Referring now to FIG. 8, illustrative cloud-computing environment 50 is depicted. As shown, cloud-computing environment 50 comprises one or more cloud-computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud-computing environment 50 to offer infrastructure, platforms and/or software as services for which a cloud consumer does not need to maintain resources on a local computing circuit. It is understood that the types of computing circuits 54A-N shown in FIG. 8 are intended to be illustrative only and that computing nodes 10 and cloud-computing environment 50 can communicate with any type of computerized circuit over any type of network and/or network addressable connection (e.g., using a web browser).

Figure 9:
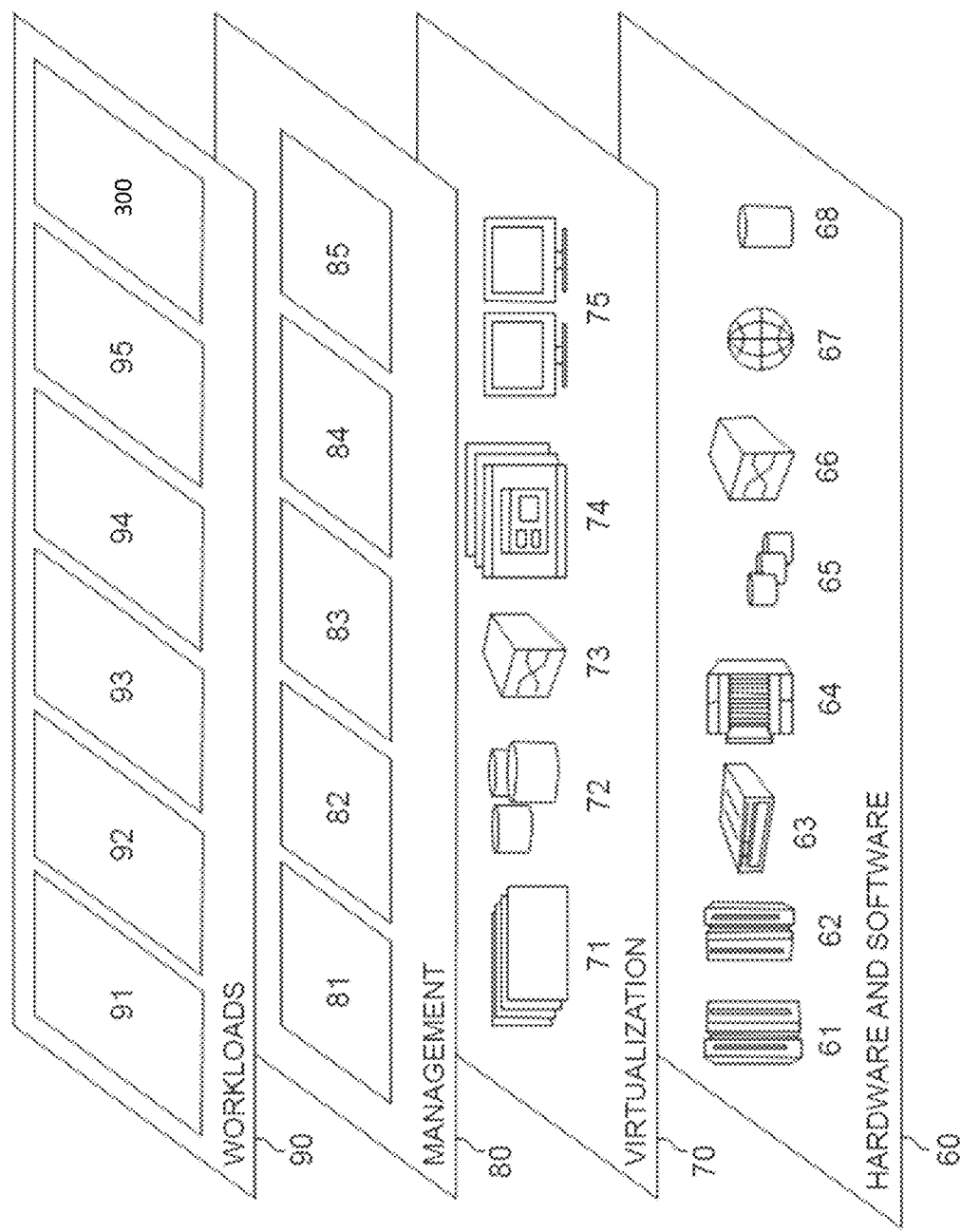
FIG. 9 depicts abstraction model layers according to an embodiment of the present invention.

Referring now to FIG. 9, an exemplary set of functional abstraction layers provided by cloud-computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud-computing environment. Metering and Pricing 82 provide cost tracking as resources are utilized within the cloud-computing environment, and billing or invoicing for consumption of these resources. In one example, these resources may comprise application software licenses. Security provides identity verification for cloud consumers and tasks, as well as protection for data and other resources. User portal 83 provides access to the cloud-computing environment for consumers and system administrators. Service level management 84 provides cloud-computing resource allocation and management such that required service levels are met. Service Level Agreement (SLA) planning and fulfillment 85 provide pre-arrangement for, and procurement of, cloud-computing resources for which a future requirement is anticipated in accordance with an SLA.

Workloads layer 90 provides examples of functionality for which the cloud-computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the method 300.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented method comprising:
receiving a first input at a first element among a plurality of elements associated with at least one electronic document;
determining a second element associated with the first element from the plurality of elements based on predetermined relations of the plurality of elements;
causing a view to be displayed together with an electronic document including the first element, the view at least including the second element;
in response to receiving a second input, determining a second subgraph of a graph including a second plurality of nodes;
causing the second subgraph to be simultaneously displayed with the first element; and
in response to receiving a third input at a third node of the second subgraph, causing an element represented by the third node to be simultaneously displayed with the first element,
wherein the plurality of elements are represented by nodes in a graph, and the relations of the plurality of elements are represented by edges in the graph between the nodes,
wherein the determining the second element comprises determining a first subgraph of the graph including a first plurality of nodes in response to a distance between a first node and each of a first plurality of nodes being less than a predetermined distance threshold and a weight of each of the first plurality of nodes being greater than a predetermined weight threshold, and
wherein the predetermined distance threshold and the predetermined weight threshold are configurable by user.

2. The computer-implemented method of claim 1, Wherein the edges in the graph include an undirected edge indicating that elements represented by nodes connected through the undirected edge are in proximity to each other.

3. The computer-implemented method of claim 1, wherein the determining the second element comprises:
   determining a first node in the graph representing the first element;
   determining a second node in the graph based on at least one of the following:
      a distance between the first and second nodes, or
      weights of nodes between the first and second nodes; and
   determining an element represented by the second node as the second element.

4. The computer-implemented method of claim 3, wherein the determining the second node further comprises:
   determining a first subgraph of the graph including a first plurality of nodes in response to determining one of the first plurality of nodes as the second node.

5. The computer-implemented method of claim 4, further comprising:
   in response to receiving a fourth input at a fourth node of the second subgraph, determining a third subgraph of the graph including a third plurality of nodes in response to at least one of the following:
      a distance between the fourth node and each of the third plurality of nodes being less than a predetermined distance threshold or a weight of each of the third plurality of nodes being greater than a predetermined weight threshold; and
   causing the third subgraph to be displayed.

6. The computer-implemented method of claim 4, in response to receiving a fourth user input, the first subgraph and second subgraph are reconstructed.

7. The computer-implemented method of claim 4, wherein the second subgraph includes the first subgraph.

8. The computer-implemented method of claim 1, embodied in a cloud-computing environment.

9. The computer-implemented method of claim 1, in response to receiving a fourth user input, the second subgraph is reconstructed.

10. The computer-implemented method of claim 1, wherein the determining the second element comprises:
   determining a first node in the graph representing the first element;
   determining a second node in the graph based on at least one of the following:
      a distance between the first and second nodes, or
      weights of nodes between the first and second nodes; and
   determining an element represented by the second node as the second element, and
   wherein the determining the second node comprises determining a first subgraph of the graph including a first plurality of nodes in response to determining one of the first plurality of nodes as the second node.

11. The computer-implemented method of claim 1, wherein determining the second element comprises:
   determining a first node in the graph representing the first element;
   determining a second node in the graph based on a distance between the first and second nodes and weights of nodes between the first and second nodes; and
   determining an element represented by the second node as the second element.

12. The computer-implemented method of claim 11, wherein the determining the second element associated with the first element determines the association based on a relationship between the elements, the relationship including definition, reference, dependency, inclusion, and peer.

13. The computer-implemented method of claim 1, wherein the determining the second element associated with the first element determines the association based on a relationship between the elements, the relationship including definition, reference, dependency, inclusion, and peer.

14. A system comprising:
   a processor; and
   a memory, the memory storing instructions to cause the processor to perform:
      receiving a first input at a first element among a plurality of elements associated with at least one electronic document;
      determining a second element associated with the first element from the plurality of elements based on predetermined relations of the plurality of elements;
      causing a view to be displayed together with an electronic document including the first element, the view at least including the second element;
      in response to receiving a second input, determining a second subgraph of a graph including a second plurality of nodes;
      causing the second subgraph to be displayed; and
      in response to receiving a third input at a third node of the second subgraph, causing an element represented by the third node to be displayed,
   wherein the plurality of elements are represented by nodes in a graph, and the relations of the plurality of elements are represented by edges in the graph between the nodes,
   wherein the determining the second element comprises determining a first subgraph of the graph including a first plurality of nodes in response to a distance between a first node and each of a first plurality of nodes being less than a predetermined distance threshold and a weight of each of the first plurality of nodes being greater than a predetermined weight threshold, and
   wherein the predetermined distance threshold and the predetermined weight threshold are configurable by the user.

15. The system of claim 14, wherein the edges in the graph include an undirected edge indicating that elements represented by nodes connected through the undirected edge are in proximity to each other.

16. The system of claim 14, wherein the determining the second element comprises:
   determining a first node in the graph representing the first element;
   determining a second node in the graph based on at least one of the following:
      a distance between the first and second nodes, or
      weights of nodes between the first and second nodes; and
   determining an element represented by the second node as the second element.

17. The system of claim 16, wherein the determining the second node comprises:
   determining a first subgraph of the graph including a first plurality of nodes in response to determining one of the first plurality of nodes as the second node.

18. The system of claim 17, further comprising:
   in response to receiving a fourth input at a fourth node of the second subgraph, determining a third subgraph of the graph including a third plurality of nodes in response to at least one of the following:
a distance between the fourth node and each of the third plurality of nodes being less than a predetermined distance threshold or a weight of each of the third plurality of nodes being greater than a predetermined weight threshold; and
causing the third subgraph to be displayed.

19. The system of claim 14, embodied in a cloud-computing environment.

20. A computer program product for electronic document display, the computer program product comprising a computer-readable storage medium having program instructions embodied therewith, the program instructions being executable by a computer to cause the computer to:
receive a first input at a first element among a plurality of elements associated with at least one electronic document;
determine a second element associated with the first element from the plurality of elements based on predetermined relations of the plurality of elements;
cause a view to be displayed together with an electronic document including the first element, the view at least including the second element;
in response to receiving a second input, determining a second subgraph of a graph including a second plurality of nodes;
causing the second subgraph to be displayed; and
in response to receiving a third input at a third node of the second subgraph, causing an element represented by the third node to be displayed,
wherein the plurality of elements are represented by nodes in a graph, and the relations of the plurality of elements are represented by edges in the graph between the nodes,
wherein the determining the second element comprises determining a first subgraph of the graph including a first plurality of nodes in response to a distance between a first node and each of a first plurality of nodes being less than a predetermined distance threshold and a weight of each of the first plurality of nodes being greater than a predetermined weight threshold, and
wherein the predetermined distance threshold and the predetermined weight threshold are configurable by the user.

* * * * *